Dec. 18, 1934.   J. J. CROWE   1,985,080

OXYGEN CUTTING PROCESS

Filed Dec. 3, 1929

INVENTOR
John J. Crowe
By _____
ATTORNEY

Patented Dec. 18, 1934

1,985,080

UNITED STATES PATENT OFFICE 1,985,080

OXYGEN CUTTING PROCESS

John J. Crowe, Westfield, N. J., assignor to Air Reduction Company, Incorporated, New York, N. Y., a corporation of New York Application December 3, 1929, Serial No. 411,239

5 Claims. (Cl. 148—9)

My invention relates to an improvement in the art of oxygen cutting of metals in which a stream of oxygen serves to oxidize and disintegrate the metal along the line of cut, thereby forming a kerf. This art is exemplified by its most highly developed fields, namely those of oxyacetylene and oxyhydrogen cutting of steel, in which a torch or burner is used to heat a region at the surface of the steel and also to direct a stream of oxygen against this heated region, the cutting operation being accomplished in a manner well known to those skilled in the art.

An object of my invention is to render such cutting more economical than has heretofore been characteristic of this art. With this end in view I have contrived means whereby the width of the kerf formed in cutting the metal is reduced to a minimum. Consequently, the amount of metal which must be disintegrated by the oxygen is at a minimum, and finally the oxygen required for disintegrating the metal and executing the cut is also reduced to a minimum. Stated in another way, a kerf of given length and depth can be cut in a given time with less consumption of oxygen than would otherwise be required, or, conversely, for a given consumption of oxygen the linear speed of cutting can be increased.

The least width of kerf is in itself a desideratum in most cases, particularly for accurate cutting by aid of machines, and in addition to this an object of the invention is to produce walls which are especially true and smooth, this also being an advantage in all accurate operations.

Heretofore it has been customary to deliver and to direct the cutting oxygen jet to the metal being severed by means of a cylindrical passage in the end of a cutting tip or any suitable oxygen jet delivering member. This passage is usually referred to as the cutting orifice by those skilled in the art to distinguish it from other passages in the cutting tip which serve other purposes.

I have observed that the width of the kerf formed in severing a piece of steel when making use of a cutting tip with such a discharge passage is always greater than the diameter of the cutting orifice. This I have found is because the oxygen stream expands in cross section after it emerges from the cutting orifice. The expansion is primarily due to the fact that with cutting orifices as heretofore constructed the pressure of the emerging stream is considerably above atmospheric.

My invention consists in so shaping the discharge passage that the width of the oxygen stream and its tendency to expand are reduced to a minimum. The expansive tendency is minimized by so shaping the discharge passage that the pressure of the stream is largely or entirely translated into velocity. The advantage of this transformation is twofold, for besides minimizing the expansion of the cutting jet, the increased velocity proves to be decidedly advantageous per se. In the first place, it permits a given quantity of gas to be discharged through a smaller opening and within a finer stream. In addition, a rapidly moving stream possesses a higher kinetic energy content than a slower stream and consequently is more effective in sweeping the disintegrated metal and resulting slag from the lower portions of the cut.

It must be observed that my invention enables a given thickness of metal to be cut with a much finer or narrower stream than heretofore. This may be due not only to the greater discharge capacity of the more rapidly moving stream, as related above, but also to the possibility of utilizing oxygen streams of oblong, rectangular or elliptical cross section because of the higher kinetic energy content of the higher velocity streams. When the kinetic energy content of the stream is high it is quite effective in sweeping the products of the cutting operation from a narrow kerf, but if the kinetic energy is low the slag is removed with greater difficulty and consequently narrow streams of oval or rectangular cross section are not as practicable with relatively low velocity discharges as they are with the high velocity discharges such as I obtain as a result of my invention.

Reference will be had to the accompanying drawing, which is to be understood as being merely illustrative:

Fig. 1 is a longitudinal section of a torch head and a typical cutting tip of customary design. This cutting torch is shown in relation to the material being cut, in order to illustrate the general nature of the discharging oxygen stream and the kerf formed in the material. The purpose of this view is to afford a comparison in order that the nature of the invention illustrated in the other views of the drawing may be readily apparent.

The cutting device may consist of a body having suitable leading channels and mixing provisions, together with a detachable tip containing the delivery orifices, but as far as the invention is concerned the torch might be a unitary device. The cutting jet orifices and the preheating jet orifices are preferably formed in the same delivery member, with the preheating jet orifices closely adjacent the cutting jet orifice, this being in accordance with the best standard practice, but the two kinds of jets may be delivered from separate nozzles, that also being known, and indeed any suitable agency or arrangement may be employed for heating or preheating the metal so that the cutting jet will attack it and produce a cut or severance exhibiting a kerf.

Figure 1:
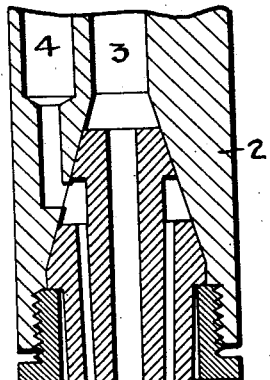
Figure 2:
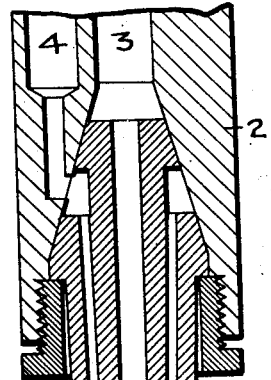
Fig. 2 is a view of the same character as Fig. 1, illustrating the method of my invention and a preferred construction of the cutting device for carrying the same into effect.
Figure 3:
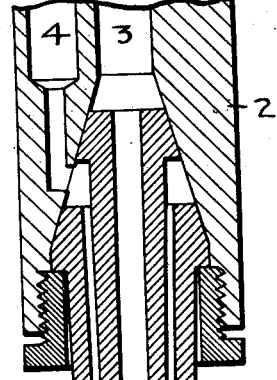
Fig. 3 is a similar view, illustrating a modified form of the cutting device.

In each of Figs. 1 to 3 a torch head is designated 2, a channel therein for conducting cutting oxygen is marked 3, and a channel for conducting a heating mixture of oxygen and a fuel gas is marked 4. The cutting tip of Fig. 1 is designated 5, that of Fig. 2 is marked 5$^a$, and the tip of Fig. 3 is marked 5$^b$.

Preheating jet orifices in the tip are marked 6 in the several views, and the cones of the flames delivered from such orifices are indicated at 7. In Fig. 1 the cutting jet orifice, from which the kerf-forming oxygen stream is discharged, is marked 8.

This view is illustrative of the prior art and indicates the manner in which the oxygen stream 9 spreads on leaving a cylindrical orifice, resulting in the producing of a kerf 10 in the material 11 which is quite wide as compared with the discharge orifice. It is understood, of course, that the production of the kerf involves the displacement of the torch or of the work at appropriate speed in the direction, or reverse direction, of the desired severance or slotting.

It is customary to provide an enlarged approach passage 12 leading to the cutting orifice 8, in order to minimize the pressure drop required to deliver the oxygen to the cutting orifice, and I preferably make use of such an approach passage in the carrying out of my present invention. By referring to Figs. 2 and 3 it will be seen that I have departed from the simple cylindrical or parallel walled form of cutting orifice used heretofore for kerf cutting, and have substituted a particular type of divergent passage 18 which I shall presently describe in detail.

Whereas about 1000 feet per second and 3 to 5 atmospheres are the approximate velocity and pressure of the oxygen stream delivered from tips as heretofore constructed with cylindrical cutting orifices, the velocity of the oxygen stream discharged from tips which I have constructed with suitable divergent nozzles is on the order of 1600 to 1800 feet per second, and the pressure of the emerging oxygen stream is approximately 1 atmosphere.

These high velocities and low pressures can not be realized if the degree of divergence of the walls of the cutting orifice is too great. When it exceeds a certain critical value, the oxygen stream will become highly turbulent and as a consequence the kinetic energy of the stream will be uselessly dissipated and its velocity will be reduced to a low order, namely to a value less than 1000 feet per second. As a further consequence its pressure will be only moderately reduced. It must be understood that the maximum permissible divergence for the cutting orifice of my invention can not be accurately defined in terms of the angular divergence involved, for the critical value of the angle of divergence is affected not only by the size of the orifice involved but also by the type of finish or smoothness of the walls of the passage. Moreover, a greater angle of divergence is practicable near the larger end of this orifice than near the smaller end.

One accurate means of defining the degree of divergence of the cutting orifice of my invention is as follows, viz.: that the degree of divergence should be small enough so that the cross-sectional area of this passage does not increase as fast as the growth in specific volume of the oxygen as it passes succeeding cross sections. This will insure that the speed of the stream increases from cross section to cross section, while the pressure of the stream steadily decreases in an orderly fashion.

For maximum efficiency the orifice length and the ratio of the terminal cross-sectional areas of the cutting orifice should be sufficient to drop the pressure of the oxygen stream to atmospheric pressure when a particular operating pressure is used, the magnitude of which depends upon such considerations as the practicability of designing regulators to deliver high operating pressures. However, I do not wish to limit my invention to the optimum relation, for I have found that a measurable improvement over older practice is obtained even though the cutting orifice is not designed to fully realize the maximum attainable efficiency.

The carrying out of the invention calls for high indicated operating pressures, upwards of about 80–90 lbs., and thence, depending upon the size of the orifice and the degree of divergence, as much higher as regulators may permit. There is a critical ratio of the pressure of the atmosphere at the discharge end of the orifice to the pressure of the oxygen immediately behind the throat 20 where the divergence begins, above which ratio back pressure into the oxygen orifice will create turbulence which destroys the velocity of the issuing stream. The pressure behind the throat is to be understood as the combination of the static and dynamic heads at this point, and is of course not the pressure indicated on the gauge as usually located.

I have found that it is preferable in practice to terminate the divergent passage with a straight portion 18$^a$ as shown in Fig. 2 rather than to continue the divergence to the extreme end of the tip as illustrated by Fig. 3. The former type of passage results in the smoothest and most uniform cuts.

Figs. 2 and 3 represent the issuing cutting stream 9$^a$ which is obtained with this invention. It spreads very little if at all and the resulting kerf is distinctly narrower than it would be if made with the cutting jet of the prior art, assuming the discharge areas of the orifices to be the same in both cases. Further than this, however, the very great increase in the kinetic energy of the stream makes it possible to operate with even smaller discharge areas than would be appropriate with cylindrical cutting orifices, and this again contributes to the narrowing of the kerf.

It will be readily seen that this invention is not a case of enlarging an oxygen orifice as in the Walker Patent 1,726,327, for example. In accordance with my invention the discharge area of the cutting orifice is kept as small as possible for the thickness of metal to be cut, or is actually reduced in size as compared with a cylindrical orifice designed for cutting an equal thickness of metal, and the walls of the orifice diverge to this discharge area from a throat 20, which is preferably narrow in comparison to the unobstructed approach passage 12 which leads to it.

In the case of a shorter tip, this throat might be located at the rear end of the tip, in which event the approach passage would be the passage in the head or body of the torch. The throat is preferably formed with a rounded or trumpet-like entrance, but this is not essential, though it is desirable that the broad approach passage and the narrow throat shall not be joined by a right-angled shoulder.

In the Walker patent referred to the plan was to reduce the velocity of the oxygen jet materially and to cause it to spread, in both of which respects it is directly contrary to my invention. The Walker tip was designed for operations other than kerf cutting,—for example that disclosed in the Rooke Patent 1,732,912,—which call for a large area stream of lowered velocity, whereas my purpose is to cut kerfs through metal, and the advantages of my invention result from keeping the cutting stream as narrow as possible and giving it the maximum issuing velocity. The increase in the kinetic energy of the oxygen jet which I obtain is highly important in cutting thick sections.

In the drawing no attempt has been made to indicate comparative roughness or smoothness of the cut as between Fig. 1 on the one hand and Figs. 2 and 3 on the other hand, but it may be stated that in general my invention makes possible cleaner as well as narrower cuts, smoother walls and walls more truly parallel from top to bottom than when prior kerf cutting practice is followed. Another of the advantages of the increased kinetic energy of the oxygen stream is that the amount of the drag at the lower part of the kerf can be reduced, the deflection of the drag when changing the direction of the cut being likewise reduced.

As previously stated, economy in consumption of oxygen in making cuts through metal is a primary object.

Figure 4:
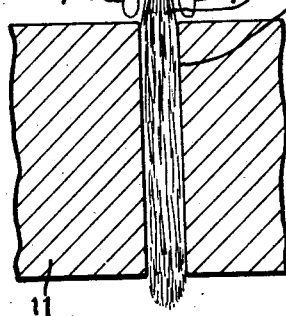
Figs. 4, 5 and 6 are sectional plan views taken on a line such as 4—4 indicated in Figs. 2 and 3. These views illustrate three different possible shapes of cross-section for the cutting orifice.
Figure 5:
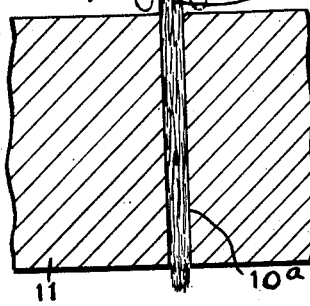
Figure 6:
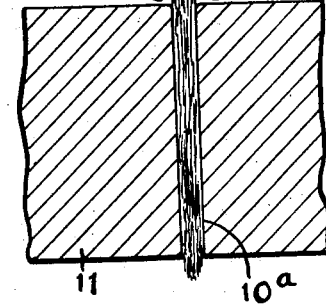

The shape of the cross-section of the cutting orifice 18 or its extension 18ᵃ may be circular as illustrated in Fig. 4, but the shapes illustrated in Figs. 5 and 6 give rise to a higher cutting efficiency because of the thinner jet discharged and the even narrower kerf which may thus be obtained. It is particularly desirable that the outer end of the cutting orifice be of elliptical or rectangular cross section, but it is not necessary that the entire length of the orifice be of such a shape. Thus it may be convenient to produce an approximately elliptical shape merely by applying a lateral pressure to the end of a tip in which has previously been formed a divergent cutting orifice of circular cross section. The result, as shown in Fig. 5, is an orifice the cross section of which is elongated or flattened, having more or less straight sides and rounded ends.

The flattening or elongation of the orifice may be produced in the divergent part 18 or in the parallel walled extension 18ᵃ if the latter is present, or in both.

I claim:

1. The process of oxygen cutting of metals by means of a stream of oxygen of velocity greater than 1000 feet per second and pressure approximately atmospheric.

2. The process of oxygen cutting of metals by means of a stream of oxygen of velocity about 1600–1800 feet per second and exit pressure not greatly exceeding that of the atmosphere into which it is delivered.

3. In the art of oxygen cutting of metals the method of delivering an oxygen cutting jet at velocity greater than 1000 feet per second while minimizing its exit pressure, which comprises passing the oxygen through a divergent cutting orifice and causing the specific volume of the oxygen to increase more rapidly in its passage through said orifice than the orifice increases in cross-section.

4. The process of oxygen cutting of metals which comprises supplying the cutting oxygen under high pressure to a divergent cutting orifice the cross-sectional area of which does not increase as fast as the growth in specific volume of the oxygen as it passes succeeding cross-sections.

5. The process of oxygen cutting of metals which comprises supplying the cutting oxygen under high pressure to a divergent cutting orifice the cross-sectional area of which does not increase as fast as the growth in specific volume of the oxygen as it passes succeeding cross-sections, and delivering the cutting jet from a substantially straight or non-divergent continuation of said orifice.

JOHN J. CROWE.